United States Patent
Huang et al.

(10) Patent No.: US 7,929,053 B2
(45) Date of Patent: Apr. 19, 2011

(54) WAVEFORM GENERATOR AND RELATED METHOD THEREOF

(75) Inventors: Yueh-Hsing Huang, Tai-Chung Hsien (TW); Tsung-Chi Lin, Taipei (TW); Te-Ming Kuo, Hsin-Chu Hsien (TW); Ming-Jane Hsieh, Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 1140 days.

(21) Appl. No.: 11/620,048

(22) Filed: Jan. 5, 2007

(65) Prior Publication Data
US 2007/0165138 A1 Jul. 19, 2007

(30) Foreign Application Priority Data
Jan. 19, 2006 (TW) .............................. 95102112 A

(51) Int. Cl.
*H04N 7/01* (2006.01)
(52) U.S. Cl. .................. 348/441; 348/458
(58) Field of Classification Search .............. 348/441, 348/554–557, 443, 448, 458; *H04N 7/01, H04N 11/20, 3/27, 5/46*
See application file for complete search history.

(56) References Cited

U.S. PATENT DOCUMENTS
| | | | |
|---|---|---|---|
| 6,040,868 A * | 3/2000 | Jun ........................... 348/448 |
| 6,369,857 B1 | 4/2002 | Balaban |
| 6,633,333 B1 | 10/2003 | Spencer |
| 2006/0197868 A1* | 9/2006 | Ogo ........................... 348/448 |
| 2008/0260048 A1 | 10/2008 | Oomen |

FOREIGN PATENT DOCUMENTS
TW 530491 5/2003
TW 200531554 9/2005

* cited by examiner

*Primary Examiner* — Sherrie Hsia
(74) *Attorney, Agent, or Firm* — Winston Hsu; Scott Margo

(57) ABSTRACT

The invention relates to a waveform generator and the related method thereof for generating a second image data according to a first image data, wherein the first image data and the second image data correspond to different signal formats. The waveform generator includes: a first memory unit, a second memory unit, and an integrating unit. The first memory unit stores a plurality of scan line patterns. The second memory unit stores at least one first scan line data of the first image data, where each first scan line data corresponds to a scan line. The integrating unit is coupled to the first and the second memory units and generates each second scan line data of the second image data according to the plurality of scan line patterns or each first scan line data of the first image data.

13 Claims, 2 Drawing Sheets

L0

L1

L2

L3

L4

L5

WAVEFORM GENERATOR AND RELATED METHOD THEREOF

BACKGROUND OF THE INVENTION

1. Field of the Invention

The invention relates to a waveform generator and related method thereof, and more particularly, to a waveform generator for signal format conversion and related method thereof.

2. Description of the Prior Art

Full-motion video display with analog video signals is commonly used in television systems. However, full-motion video display using digital video signals becomes more popular for the rapid advance of computer processing ability and decrease in system cost. Digital video systems are more competitive than the traditional analog video systems in comparison with the generating, modifying, transmitting, storing, and broadcasting of full-motion video sequence.

Simply described, broadcasting a digital video signal is continuously broadcasting (or transmitting) a large number of image frames in a frequency range from 30 Hz to 75 Hz. Each image frame is actually a static image composed of a pixel array, and the size of the pixel array depends on the display resolution of a specific playback system. For example, VHS systems have a display resolution of (320*240), NTSC systems have a display resolution of (720*480), and HDTV systems have a display resolution of (1920*1080).

There are various signal formats for digital video signals. In one method, a digital video display device compatible with a specific signal format is able to play a digital video signal of the specific signal format. While in the other, before transmitting a digital video signal of a first signal format to the digital video display device, a controller is required to convert the digital video signal of the first signal format into a digital video signal of a second signal format acceptable by the digital video display device to thereby solve the playback problem caused by different signal formats.

SUMMARY OF THE INVENTION

It is therefore one of the objectives of the claimed invention to provide a waveform generator for converting image data of one signal format into image data of another signal format.

According to an embodiment of the present invention, a waveform generator is disclosed. The claimed invention comprises: a first memory unit, a second memory unit, and an integrating unit. The first memory unit stores a plurality of line patterns. The second memory unit stores at least one first line data of the first image data, where each first line data corresponds to a scan line. The integrating unit is coupled to the first and the second memory units and generates each second line data of the second image data according to at least one of the plurality of line patterns and each first line data of the first image data.

According to an embodiment of the claimed invention, a waveform generating method is disclosed. The waveform generating method for generating a second image data according to a first image data, wherein the first image data and the second image data correspond to different signal formats, the waveform generating method comprising: storing a plurality of line patterns; storing at least one first line data of the first image data, where each first line data corresponds to a scan line; and generating each second line data of the second image data according to at least one of the plurality of line patterns or each first line data of the first image data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
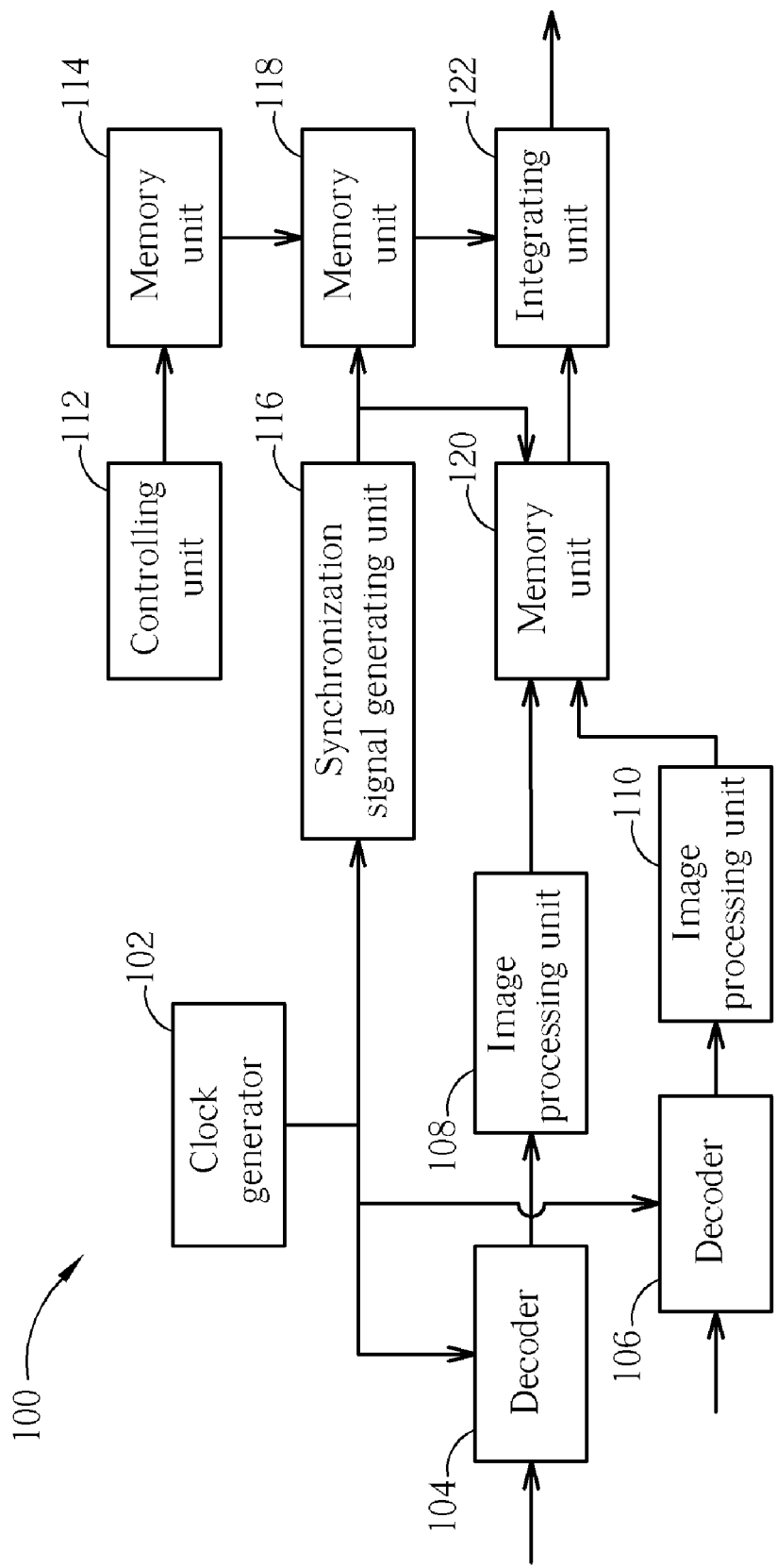
FIG. 1 is a diagram of a waveform generator according an embodiment of the present invention.

Please refer to FIG. 1. FIG. 1 is a diagram of a waveform generator 100 according an embodiment of the present invention. In this embodiment, the waveform generator 100 is applied to a digital television (DTV) controller for converting an image data F1 of a signal format to an image data F2 of another signal format and then outputting the image data F2. As shown in FIG. 1, the waveform generator 100 includes a clock generator 102, a plurality of decoders 104, 106, a plurality of image processing units 108, 110, a controlling unit 112, a plurality of memory units 114, 118, 120, a synchronization signal generating unit 116, and an integrating unit 122. The clock generator 102 is applied to generate a clock signal for synchronizing the operation among decoders 104, 106 and the synchronization signal generating unit 116. In this embodiment, the decoders 104, 106 are an MPEG2 decoder and a composite video signal decoder, respectively, and the image processing units 108, 110 perform image processing operation upon outputs of the decoders 104, 106 and store the generated image data F1 in the memory unit 120. Please note that, the decoders 104, 106 can be any other digital image data decoding apparatus and are not limited by this embodiment.

Figure 2:
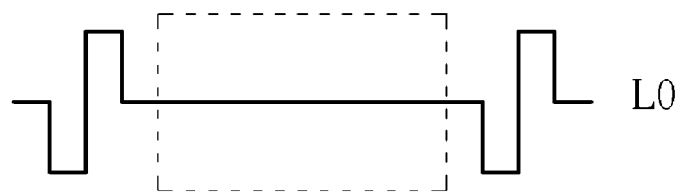
FIG. 2 is a diagram of a plurality of scan line data.
Figure 2:
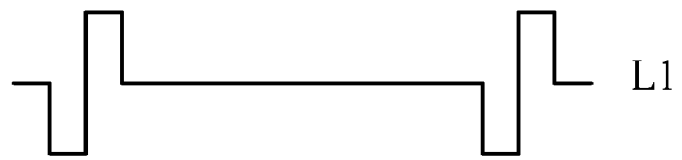
Figure 2:
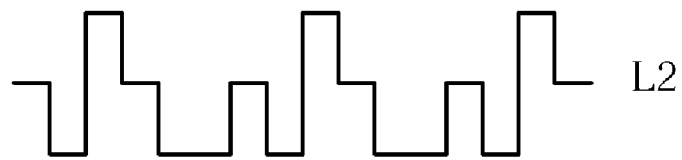
Figure 2:
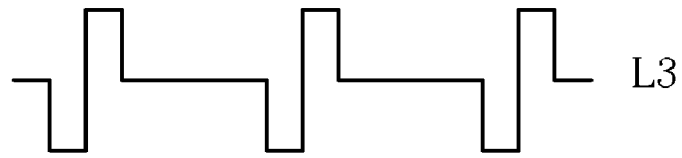
Figure 2:
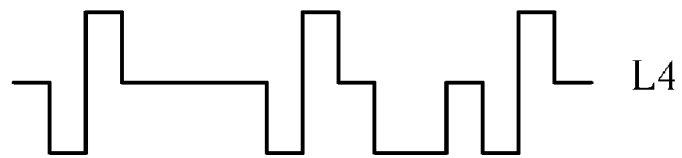
Figure 2:
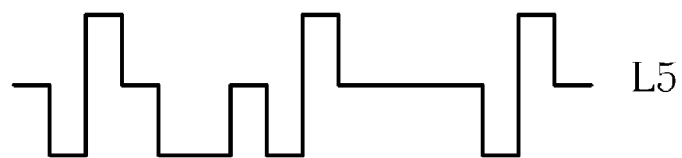

In a digital video system, an image data corresponding to a frame includes a plurality of scan line data. Some scan line data is composed of a plurality pixel data on a scan line and specific waveforms sandwiching the scan line data; while other scan line data do not have any pixel data and are merely utilized by a monitor to calibrate the synchronization or discriminate the signal format. For example, if the outputted image data F2 of the waveform generator 100 conforms to the specification of ITU-R BT.1120 and a video resolution of the image data F2 is ((1920*1080)/60i), the scan line data of the image data F2 are divided into six categories as shown in FIG. 2. FIG. 2 is a diagram of a plurality of scan line data L0, L1, . . . , L5, wherein the scan line data L0 within the dotted line rectangle comprises a plurality of pixel data, and the remaining scan line data L1, . . . , L5 have no pixel data. Therefore, the image data F2 corresponding to a frame comprises a total of 1125 scan line data ordered as below: 5 scan line data L2, one scan line data L3, 34 scan line data L1, 517 scan line data L0, 5 scan line data L1, one scan line data L4, 4 scan line data L2, one scan line data L5, 34 scan line data L1, 518 scan line data L0, and 5 scan line data L1.

Please refer to FIG. 1 again. The present invention utilizes the memory unit 118 to store a plurality of scan line patterns P0, P1, . . . , P5, wherein the scan line patterns P1, . . . , P5 are the same as scan line data L1, . . . , L5 shown in FIG. 2, but the waveform of scan line pattern P0 is the waveform of scan line data L0 excluding pixel data. When the waveform generator 100 generates each scan line data of the image data F2 orderly, the synchronization signal generating unit 116 generates synchronization signals (i.e., a conventional horizontal synchronization (H-sync) signal and vertical synchronization (V-sync)) to the memory units 118, 120, respectively. Then, the memory unit 118 determines which scan line pattern should be transmitted to the integrating unit 122 according to the received synchronization signal, and according to the received synchronization signal, the memory unit 120 determines whether the scan line data should be transmitted and which scan line data of the image data F1 should be transmitted to the integrating unit 122. If the integrating unit 122 receives one of the scan line patterns P1, . . . , P5, the integrating unit 122 directly transmits the received scan line pattern as a scan line data of the image data F2. However, if the integrating unit 122 receives a scan line pattern P0 and a scan line data of the image data F1, the integrating unit 122 integrates the received scan line data (i.e., a plurality of pixel data) and the scan line pattern P0 to generate a scan line data of the image data F2.

For example, if the synchronization signal indicates that the current output should be the first scan line data of the image data F2, the memory unit 118 will output the scanning line pattern P2, and the memory unit 120 will not output any scan line data to the integrating unit 122. If the synchronization signal indicates that the current output should be the $41^{st}$ scan line data of the image data F2, the memory unit 118 will output a scan line pattern P0, and the memory unit 120 will output the first scan line data of the image data F1 to the integrating unit 122. Similarly, if the synchronization signal indicates that the current output should be the $42^{nd}$ scan line data of the image data F2, the memory unit 118 will output the scan line pattern P0, and the memory unit 120 will output the second scan line data of the image data F1 to the integrating unit 122; and so on.

Image data complying with different signal specifications (e.g., the digital video broadcasting (DVB) specification and advanced television systems committee (ATSC) specification) or different video resolutions have different scan line patterns, therefore, the waveform generator 100 of the present invention utilizes the memory unit 114 to store a plurality candidate scan line pattern sets. Accordingly, users are capable to change the signal format and resolution of the image data F2 according to their requirements. When the signal format and resolution is chosen by a user, the controlling unit 112 outputs a control signal to the memory unit 114 to instruct the memory unit 114 to output a corresponding candidate scan line pattern set to the memory unit 118. The chosen candidate scan line pattern set includes a plurality of scan line patterns corresponding to the signal format and resolution chosen by the user, therefore, the image data F2 generated by the waveform generator 400 can conform to the signal format and resolution required by user. Additionally, because the signal formats utilized in different countries are different, a manufacturer of the waveform generator 100 can reference the country to which the waveform generator 100 is shipped to determine which candidate scan line pattern sets are installed into the memory unit 114, thereby saving memory space and cost.

In conclusion, the waveform generator 100 of the present invention utilizes the memory unit 118 to store a plurality of scan line patterns and generates a specific scan line pattern to transmit to the integrating unit 122 according to a synchronization signal. Accordingly, the integrating unit 122 is capable of generating every scan line data of the image data F2 according to the specific scan line pattern and each scan line data of the image data F1. In addition, the user simply installs different scanning line patterns into the memory unit 118 utilizing the controlling unit 112 for changing the signal format or the resolution of the image data F2 output from the waveform generator 100.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A waveform generator for generating a second image data according to a first image data, the first image data and the second image data corresponding to different signal formats, the waveform generator comprising:
   a first memory unit for storing a plurality of scan line patterns;
   a second memory unit for storing at least one first scan line data of the first image data, the each first scan line data corresponding to a scan line; and
   an integrating unit, for generating each second scan line data of the second image data according to at least one of the scan line patterns and the each first scan line data of the first image data.

2. The waveform generator of claim 1, further comprising:
   a synchronization signal generating unit, for generating a synchronization signal, wherein the first memory unit outputs one of the scan line patterns to the integrating unit according to the synchronization signal, and the integrating unit generates the second scan line data of the second image data according to the scan line pattern outputted from the first memory unit.

3. The waveform generator of claim 2, wherein the second memory unit outputs one of the first scan line data to the integrating unit according to the synchronization signal, and the integrating unit generates the second scan line data of the second image data according to the scan line pattern outputted from the first memory unit and the first scan line data outputted from the second memory unit.

4. The waveform generator of claim 2, wherein the synchronization signal comprises a horizontal synchronization (H-sync) signal and a vertical synchronization (V-sync) signal.

5. The waveform generator of claim 1, further comprising:
   a controlling unit for outputting a control signal according to one of a plurality of signal formats corresponding to the second image data.

6. The waveform generator of claim 5, further comprising:
   a third memory unit, coupled to the controlling unit and the first memory unit, for storing a plurality of candidate scan line pattern sets corresponding the plurality of signal formats, and for outputting one of the candidate scan line pattern sets comprising the scan line patterns into the first memory unit according to the control signal.

7. The waveform generator of claim 1, being implemented in a digital television (DTV) controller.

8. A waveform generating method for generating a second image data according to a first image data, the first image data and the second image data corresponding to different signal formats, the waveform generating method comprising:
   storing a plurality of scan line patterns;
   storing at least one first scan line data of the first image data, the each first scan line data corresponding to a scan line; and
   generating each second scan line data of the second image data according to at least one of the scan line patterns and each first scan line data of the first image data.

9. The waveform generating method of claim 8, further comprising:
   generating a synchronization signal; and
      retrieving one of the scan line patterns according to the synchronization signal for generating the second line data of the second image data.

10. The waveform generating method of claim 9, further comprising:

retrieving one of the first scan line data according to the synchronization signal; and generating the second scan line data of the second image data according to the scan line pattern and the first scan line data outputted.

11. The waveform generating method of claim 9, wherein the synchronization signal comprises a horizontal synchronization (H-sync) signal and a vertical synchronization (V-sync) signal.

12. The waveform generating method of claim 8, further comprising:

generating a control signal according to the signal format corresponding to the second image data;

storing a plurality of candidate scan line pattern sets corresponding a plurality of signal formats; and storing one of the candidate scan line pattern sets comprising the scan line patterns according to the control signal.

13. The waveform generating method of claim 8, being applied to a digital television (DTV) controller.

* * * * *